US007207012B1

(12) United States Patent
House et al.

(10) Patent No.: US 7,207,012 B1
(45) Date of Patent: Apr. 17, 2007

(54) SYSTEM AND METHOD FOR MAPPING DEPLOYMENT STATUS OF HIGH BANDWIDTH METROPOLITAN AREA NETWORKS

(75) Inventors: Ron L. House, Stillwell, KS (US); Paul Caccavo, Olathe, KS (US); George L. Stahl, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 844 days.

(21) Appl. No.: 10/354,346

(22) Filed: Jan. 30, 2003

(51) Int. Cl.
 *G06F 3/00* (2006.01)
 *G06F 3/01* (2006.01)
(52) U.S. Cl. ............... 715/853; 455/457; 715/734
(58) Field of Classification Search ........... 715/853
 See application file for complete search history.

(56) References Cited

U.S. PATENT DOCUMENTS

| | | | | |
|---|---|---|---|---|
| 5,452,415 A * | 9/1995 | Hotka | ............... | 715/735 |
| 5,559,955 A * | 9/1996 | Dev et al. | .............. | 714/4 |
| 5,751,965 A * | 5/1998 | Mayo et al. | ............... | 709/224 |
| 5,845,277 A * | 12/1998 | Pfeil et al. | .............. | 707/3 |
| 5,910,803 A * | 6/1999 | Grau et al. | ............... | 715/734 |
| 5,958,012 A * | 9/1999 | Battat et al. | ............... | 709/224 |
| 6,031,528 A * | 2/2000 | Langfahl, Jr. | ............... | 715/734 |
| 6,151,031 A * | 11/2000 | Atkins et al. | ............... | 345/441 |
| 6,219,053 B1 * | 4/2001 | Tachibana et al. | ........... | 715/835 |
| 6,225,999 B1 * | 5/2001 | Jain et al. | ................ | 715/734 |
| 6,289,380 B1 * | 9/2001 | Battat et al. | ............... | 709/224 |
| 6,396,810 B1 * | 5/2002 | Hebel | ............... | 370/248 |
| 6,628,304 B2 * | 9/2003 | Mitchell et al. | ............ | 715/734 |
| 6,633,312 B1 * | 10/2003 | Rochford et al. | ........... | 715/736 |
| 6,654,803 B1 * | 11/2003 | Rochford et al. | ........... | 709/224 |
| 6,690,884 B1 * | 2/2004 | Kelty et al. | ................... | 398/27 |
| 6,941,359 B1 * | 9/2005 | Beaudoin et al. | ........... | 709/221 |
| 7,034,825 B2 * | 4/2006 | Stowe et al. | ................ | 345/423 |
| 7,047,496 B2 * | 5/2006 | Nelles et al. | ............... | 715/736 |
| 2002/0019699 A1 * | 2/2002 | McCarty et al. | ............ | 701/211 |
| 2002/0145620 A1 * | 10/2002 | Smith et al. | ................ | 345/712 |
| 2003/0112958 A1 * | 6/2003 | Beaudoin et al. | ...... | 379/221.15 |
| 2004/0015309 A1 * | 1/2004 | Swisher et al. | ............... | 702/79 |
| 2004/0098422 A1 * | 5/2004 | Levesque et al. | ........... | 707/203 |
| 2004/0107277 A1 * | 6/2004 | Levesque et al. | ........... | 709/223 |
| 2004/0143428 A1 * | 7/2004 | Rappaport et al. | ............ | 703/22 |
| 2004/0185858 A1 * | 9/2004 | Fattouch et al. | ............ | 455/446 |
| 2004/0243299 A1 * | 12/2004 | Scaer et al. | ................ | 701/200 |
| 2005/0086612 A1 * | 4/2005 | Gettman et al. | ............ | 715/848 |

OTHER PUBLICATIONS

Mapnet et al. "Mapnet Macroscopic Internet Visualization and Measurement" Aug. 2001.*

* cited by examiner

*Primary Examiner*—Ba Huynh
*Assistant Examiner*—Steven Theriault

(57) ABSTRACT

The present invention provides a system and method for maintaining and displaying information regarding high bandwidth telecommunication cables in metropolitan areas. The present invention allows a user to select a metropolitan area for display. The user may thereafter select one or more vendors who own high bandwidth telecommunication cables in the selected metropolitan area. A user may control the prominence of displayed cables by designating selected vendors in a prioritized list.

30 Claims, 12 Drawing Sheets

SYSTEM AND METHOD FOR MAPPING DEPLOYMENT STATUS OF HIGH BANDWIDTH METROPOLITAN AREA NETWORKS

CROSS-REFERENCE TO RELATED APPLICATIONS

None.

STATEMENT REGARDING FEDERALLY SPONSORED RESEARCH OR DEVELOPMENT

None.

TECHNICAL FIELD

This invention is related to the field of high bandwidth telecommunications. More particularly, the present invention relates to the maintenance and display of information regarding the location, ownership, and other characteristics of high bandwidth telecommunications cable within a metropolitan area.

BACKGROUND OF THE INVENTION

The present invention relates to the design and implementation of high speed metropolitan area networks. More particularly, the present invention relates to the computerized mapping of the high bandwidth telecommunication cables used in metropolitan area networks to assist in the design, planning, and implementation of future cable installation and customer connections.

Connectivity has become a critical part of business and personal life in the modern world. Voice telephone connections, often in very large volumes, are essential to conduct business and other activities today. In addition to voice connections, data connections such as those used for computer networks like the Internet require high bandwidth connections for optimal operation. Voice and data connections often use the same high bandwidth telecommunications cable to carry their signals. Signals from multiple sources are often combined for efficient transport over an infrastructure of high bandwidth telecommunications cable. The infrastructure of high bandwidth telecommunications cable includes miles of cable, particularly fiber optic cable, installed in most cities across the United States and abroad. The high bandwidth telecommunications cable installed in a metropolitan area creates a high bandwidth metropolitan area network.

A telecommunication customer desiring a high bandwidth connection, for whatever purpose, must be linked to one of the high bandwidth cables installed in their metropolitan area, or a new cable to accommodate them must be installed. As the telecommunications infrastructure expands, the present location of high bandwidth telecommunications must be considered as part of planning for the installation of additional high bandwidth telecommunications cable. Thus, the location of installed high bandwidth telecommunications cables is important information for companies providing high bandwidth connectivity to customers, as well as companies that install high bandwidth infrastructure. Often, a single company performs both the function of installing the high bandwidth telecommunications infrastructure and the function of connecting telecommunications customers to that infrastructure.

Most metropolitan areas include cable owned by a wide variety of different entities. Generally, cable owners shall be referred to as "vendors" herein. Typically, vendors lease access to their cable to others, including competitors. At present, some metropolitan areas have sixty or more vendors with high bandwidth telecommunications cable installed. Maintaining records of such a large number of vendors can be extremely difficult. Making matters even more difficult, the ownership status of various cables can change frequently. Acquisitions, mergers, and other business transactions often change the ownership of particular cables. New cable also continues to be installed. Because of the installation of additional cable and the transfer of existing cable, maintaining records as to the location and ownership of high bandwidth telecommunication cables in a metropolitan area network can be a challenging task.

Simply maintaining the location and ownership of high bandwidth cable is not enough to plan a connection to the cable system. Not all locations along a high bandwidth telecommunication cable are appropriate for forming a connection. To connect to a cable, a node must be accessed. A node may take a variety of forms, some more suitable for connection than others. For example, a carrier hotel is a physical structure used to connect to a high bandwidth cable. Other forms of nodes, such as switches, may provide some ability to connect to a cable. To connect to a particular cable, some form of node must exist or be created to allow the connection to be established.

Maintaining and accessing records of the location of high bandwidth cable, the vendors who own the cable, and the location and type of node for each cable can be an extraordinarily challenging task. Because of the geographical nature of the information, the use of a map to display the relevant data is typical. However, placing all of the information regarding the high bandwidth telecommunication cable network for a metropolitan area upon one or more hard copy maps presents problems for users. First, the dynamic nature of a metropolitan area network will render a static hard copy map obsolete quickly. Moreover, the high quantity of information to be displayed on the map can be overwhelming. Additionally, depending upon the particular use of a map, not all possible information may be necessary. For example, if a company is seeking to establish a connection for a customer, that company may prefer to connect to one of a handful of vendors with which it has made special business arrangements to access their cables. In such a case, the company may wish to obtain information about other vendors only if their priority vendors do not have a cable within a predetermined distance of the customer. Displaying information regarding the location of other vendors' cables might not be desired unless it is necessary due to the absence of the preferred vendors' cables.

Of course, the maintenance of metropolitan area network maps has moved to a digital format. However, the common practice of maintaining metropolitan area network maps on a particular workstation, while superior in many regards to maintenance of hard copy maps, does not adequately address the needs of companies installing high bandwidth telecommunications cable providing connectivity to telecommunications customers. Information maintained on a single workstation can be difficult to access. Further, simply converting maps of metropolitan area high bandwidth telecommunications from a hard copy format to a digital format does not necessarily facilitate the maintenance and display of information.

The present invention addresses the need of companies installing high bandwidth telecommunications cable and providing data connectivity using high bandwidth metropolitan area networks to maintain information regarding the ownership cables, the location of cables, and the location of nodes within a metropolitan area. The present invention allows the user to preferentially display information relating to the vendors availability in a particular area, and allows the user to determine what information should be displayed for a particular purpose. The present invention also allows a user to query the system to obtain particular information, such as the presence or absence of nodes, within a particular portion of a geographical area. These and other attributes of the present invention shall be described more fully below.

BRIEF SUMMARY OF THE INVENTION

The present invention maintains and displays information regarding metropolitan area high bandwidth telecommunications cable networks. The present invention maintains geographical information regarding metropolitan areas and maintains information regarding the location of high bandwidth telecommunications cables within those metropolitan areas. The present invention allows for the use of information regarding the ownership of the telecommunications cables in a metropolitan area, the location of nodes associated with those telecommunications cables, and the ownership of particular cables in the planning of customer connections and telecommunications infrastructure installation. Further, the present invention allows a user to define buffer zones around particular telecommunications cables, and to query the system regarding the contents of the buffer zones. The present invention further provides for the prioritized display of high bandwidth telecommunications cables in a preferential order based upon the vendor owning or responsible for those cables. Through these and other functions, the present invention facilitates the planning and implementation of high bandwidth connections and high bandwidth cabling within a metropolitan area.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The present invention employs computer software to maintain and display information regarding metropolitan area high bandwidth telecommunications networks. Software implementing this invention may be placed in computer readable media such as disk drives, hard drives, magnetic tape, or any other computer readable format. While software designed in accordance with the present invention may be maintained on a single workstation, it is particularly suited for use in a networked computing environment, thereby allowing a plurality of users to easily access its capabilities.

Figure 1:
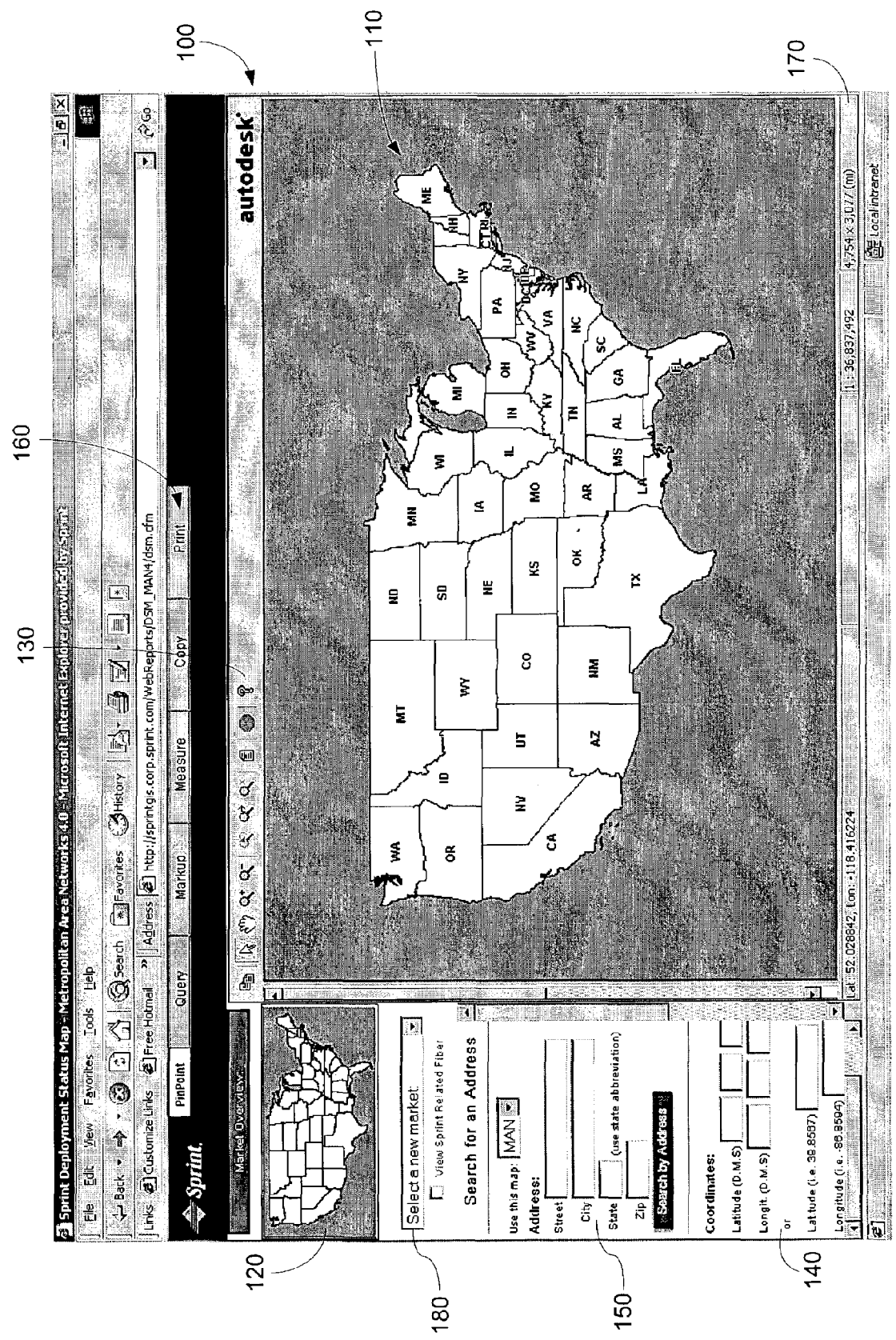
FIG. 1 illustrates an overview of the user interface of computer software in accordance with the present invention.

FIG. 1 illustrates a user interface 100 in accordance with the present invention. Within the user interface 100, a map view 110 displays geographical information regarding a metropolitan area. As shall be further illustrated, map view 110 may further display information relating to the location of high bandwidth cable, as well as other information as requested by a user. The market display 120 compactly illustrates the selected metropolitan area, if any. A map tool bar 130 is provided to allow a user to manipulate the image displayed in the map view 110. The map tool bar 130 allows the user to perform typical functions, such as magnification, demagnification, and other operations. A user may specify a specific geographic location using the coordinate entry fields 140, which permit a user to enter a latitude and longitude either in degrees, minutes, and seconds, or in decimal degrees. Alternatively, the user may enter a street address in the address entry fields 150. If the street address entered in the address entry fields 150 corresponds to an address included in the geographic information maintained by the software, as shall be further described below, that street address may be converted to a latitude and longitude for use by the software. A user positionable cursor may also be used to designate a particular geographical location as an alternative to the coordinate entry fields 140 and the address entry fields. Menu 160 allows the user to interact with the software and the displayed metropolitan area and the map view 110 to perform functions such as printing a map, creating a duplicate electronic copy, or other functions. Information pertaining to the display of the map view 110 is included in the status bar 170. A user may select a metropolitan area using the market selection menu 180. In such an embodiment, the user would position and click a cursor over the desired region or metropolitan area listed in the market selection menu 180. A user may also select a metropolitan area by selecting that metropolitan area with the user positionable cursor within the map view 110 while the map view 110 displays a region, such as the entire United States as in FIG. 1, that includes the desired metropolitan area.

Figure 2:
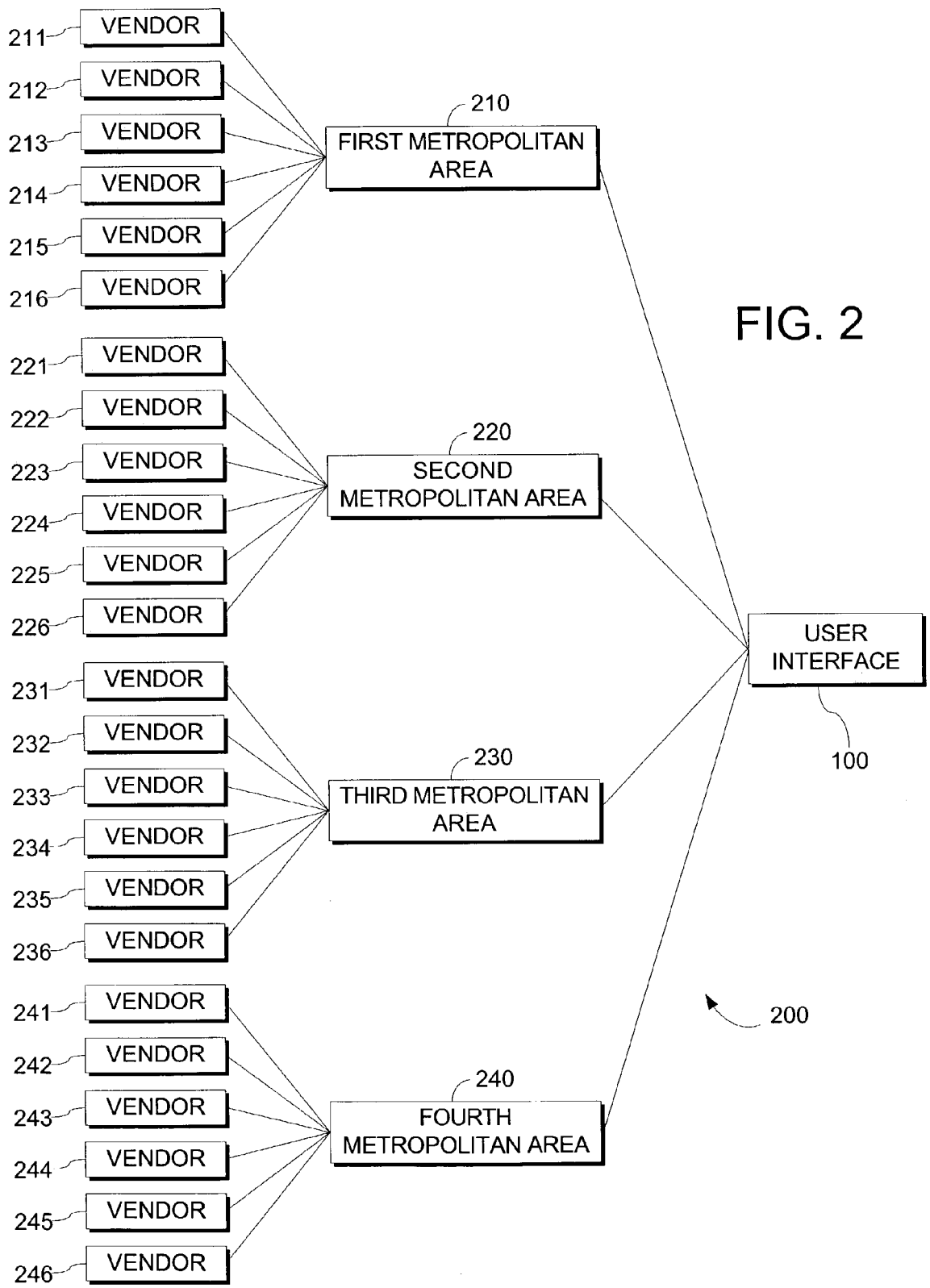
FIG. 2 illustrates the logical structure of software in accordance with the present invention.

Referring now to FIG. 2, the data structure used in accordance with the present invention is illustrated. FIG. 2 illustrates a simplified data structure 200 in accordance with the present invention. A user accesses and manipulates the information in the data structure 200 using the user interface 100. Data structure 200 includes a first metropolitan area 210, a second metropolitan area 220, a third metropolitan area 230, and a fourth metropolitan area 240. In actual usage, the present invention would likely be employed with far more metropolitan areas than the four illustrated in FIG. 2. A metropolitan area, such as the first metropolitan area 210, represents a specifically identified market as defined by the user. Typically, a metropolitan area, such as the first metropolitan area 210, will include a central city and suburbs. However, a user may, in some situations, desire to define a metropolitan area to cover a smaller or a larger geographical scope.

The data for the first metropolitan area 210, the second metropolitan area 220, the third metropolitan area 230, and the fourth metropolitan area 240 includes information needed to create a computer map of each metropolitan area, such as the locations, names, and types of streets and roads within those defined areas. This information may include details such as the geographical location of particular street addresses. While the detail of the metropolitan area data may vary for different embodiments of the invention, the metropolitan area information should be sufficient to generate a computer map of the metropolitan area. While a variety of formats may be used to maintain and display the metropolitan area information, one such form contemplated by the inventor is commercially available web-based mapping software known as Autodesk MapGuide®. Metropolitan area geographical information may be received in a variety of ways. Metropolitan area geographical information for use in generating a computerized map are commercially available and are suitable for use with the present invention. Such commercially available metropolitan area geographical information can often be received in a format for immediate use with the present invention. Alternatively, geographical information may be gathered from public domain sources by the user. If necessary, metropolitan area geographical information may be converted to a format and/or medium suitable for use with the present invention. The procedure used to receive the geographical information is immaterial to the present invention.

Within each metropolitan area, a variety of high bandwidth telecommunications cable will be present. Typically, a variety of vendors own the installed telecommunications cable. Information relating to the location of the telecommunications cable belonging to each vendor can often be obtained directly from that vendor. Ideally, such information should be obtained in a format compatible with the software used in accordance with the present invention. Alternatively, information regarding a vendor's cable and nodes may be obtained from other sources. If necessary, vendor information may be converted to a format and/or medium suitable for use with the present invention. The procedure used to receive the vendor information is immaterial to the present invention. As shown in FIG. 2, the first metropolitan area 210 includes a first vendor 211, a second vendor 212, a third vendor 213, a fourth vendor 214, a fifth vendor 215, and a sixth vendor 216. Likewise, the second metropolitan area 220, the third metropolitan area 230, and the fourth metropolitan area 240 contain a plurality of vendors. While a total of six vendors are illustrated in FIG. 2 for each metropolitan area, it should be understood that the actual number of vendors within a metropolitan area may vary, and that that number may be less than six, and, frequently, may considerably exceed the six illustrated in FIG. 2.

A user accesses information regarding the location of high bandwidth telecommunications cable in a metropolitan area through the user interface 100. Using the user interface 100, a user selects one of the available metropolitan areas. For example, a user may select the third metropolitan area 230. Geographical information regarding the third metropolitan area 230 may then be displayed to the user via the user interface 100, by, for example, using the map view 110. The user will then have the option of selecting via the user interface 100 by, for example, using the market selection menu 180 one or more vendors with cable located within the third metropolitan area 230. Vendor information, which may include the location of cables, the location of nodes, the type of cables, and the types of nodes, is received and maintained for each vendor. In the example illustrated in FIG. 2, the vendor information available for selection would be information for the first vendor 231, the second vendor 232, the third vendor 233, the fourth vendor 234, the fifth vendor 235, and the sixth vendor 236. After a user selects one or more vendors from the list of possible vendors, the location of telecommunications cable associated with the selected vendors are displayed to the user via the user interface 100.

Figure 3:
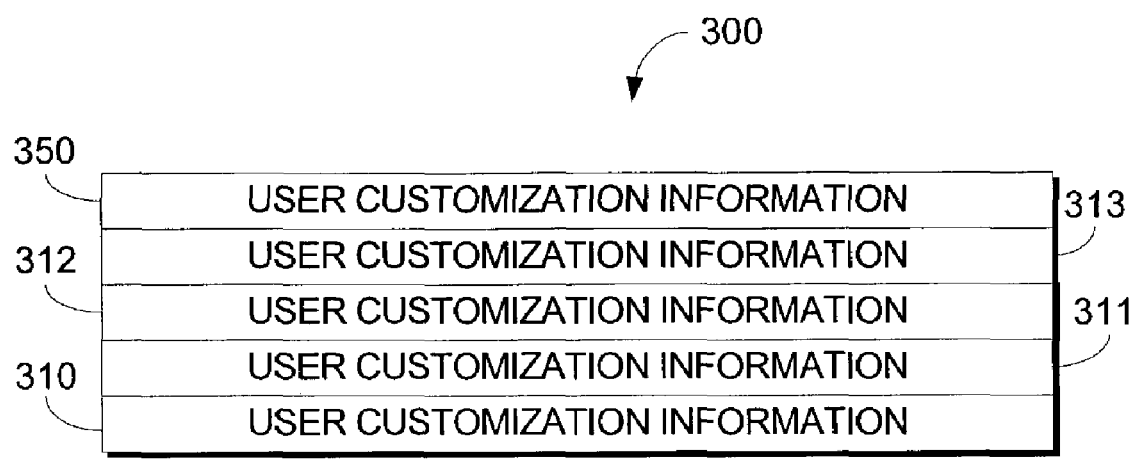
FIG. 3 illustrates display layers used in accordance with the present invention.

Referring now to FIG. 3, a display 300 comprising layers of selected information is illustrated. The display 300 may be generated for display in the map view 110 of the user interface 100. The first layer 310 is geographical information regarding the metropolitan area selected by the user. The first layer 310 includes geographical information such as street locations. Next comes the first selected vendor information displayed in layer 311. The next layer 312 may comprise the second selected vendor information. A further layer 313 may be the third selected vendor information. A large number of layers comprising selected vendor information may be included in a single display 300. Vendor information displayed may include the geographical location of high bandwidth telecommunications cable and any nodes associated with that cable. The number of layers required to display vendor information will, of course, depend upon the number of vendors selected by a user for display. A display 300 may further include a layer 350 of user customization information. Such information may be a buffer, which will be described more fully herein, or points, lines, or other figures placed by a user to create a customized map.

Figure 4:
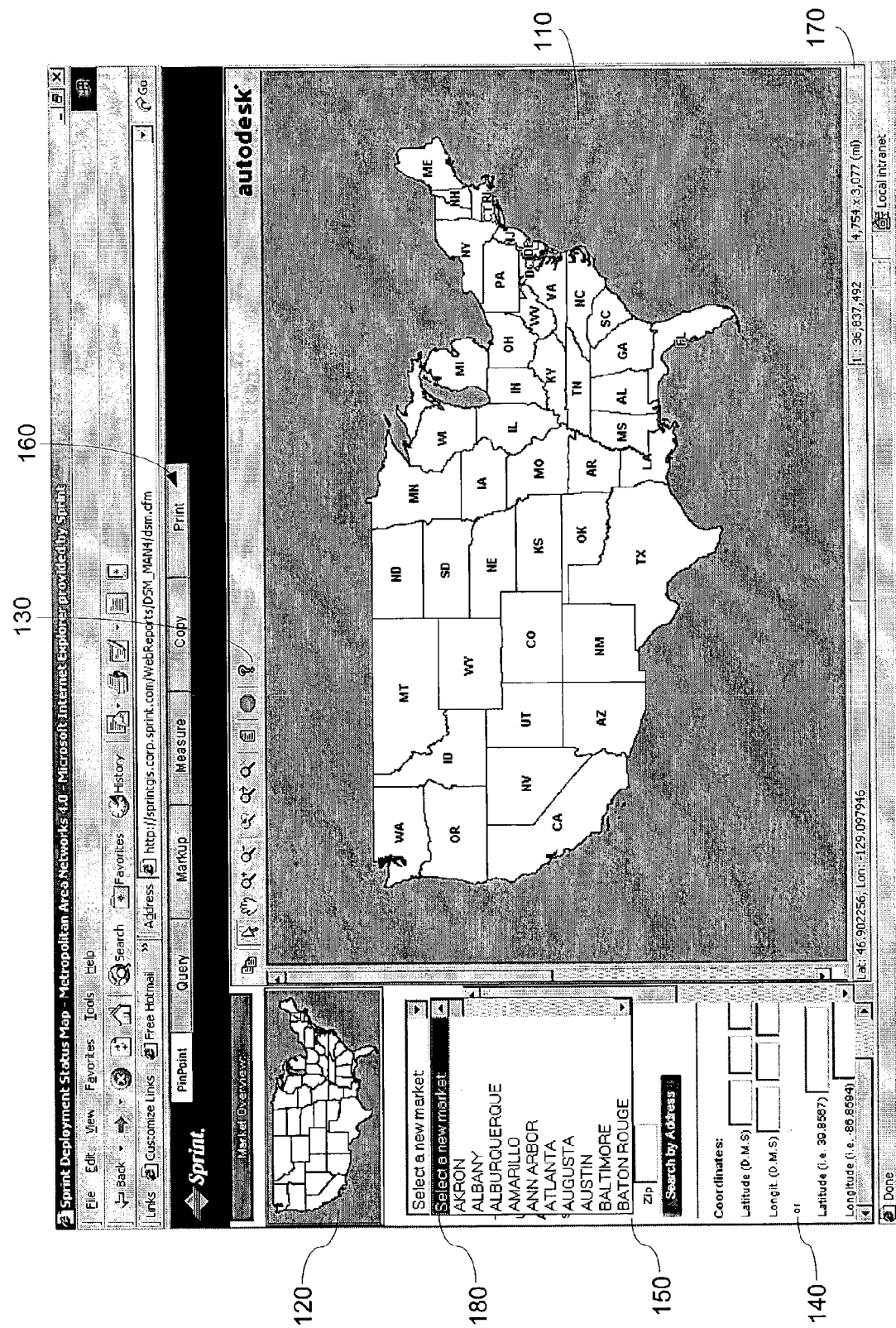
FIG. 4 illustrates the selection of a metropolitan area in accordance with the present invention.

Referring now to FIG. 4, the selection of a metropolitan area for display is further illustrated. A user has accessed the market selection menu 180, which includes a listing of metropolitan areas for possible display. Geographical information regarding the selected metropolitan area will be displayed in the map view 110.

Figure 5:
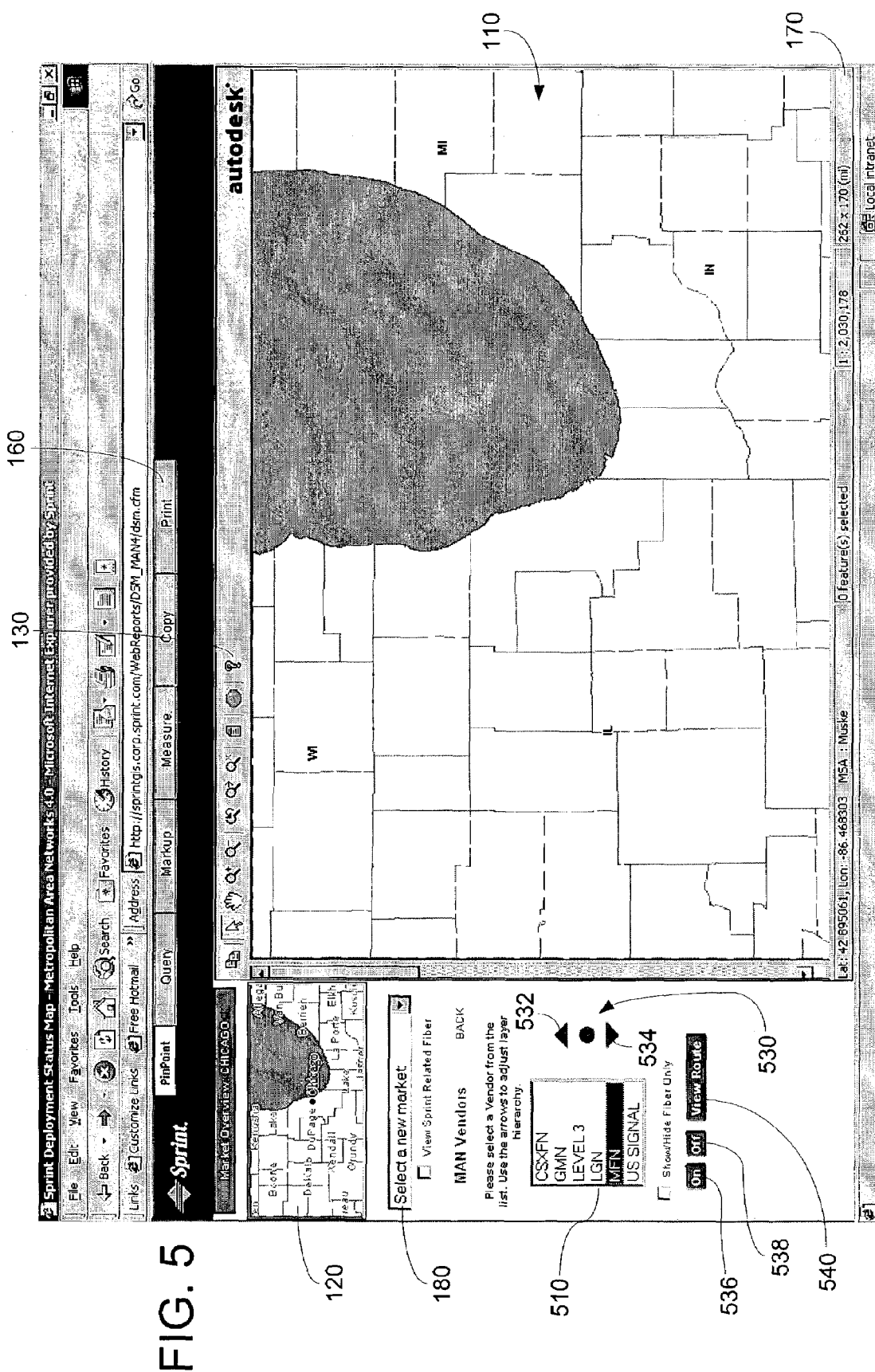
FIG. 5 illustrates the selection of a vendor in accordance with the present invention.

Referring now to FIG. 5, the present invention is illustrated after a metropolitan area has been selected. The market overview 120 illustrates a particular metropolitan area, in this example Chicago, that has been selected using the metropolitan area selection menu 180. The map view 110 displays a magnified computer generated geographical map of the larger metropolitan area. As will be appreciated in reference FIG. 5, the map display 110 shows a wide geographical area. The geographical area displayed in conjunction with each metropolitan area may be varied using the tool bar 130. A user may select vendors from a vendor menu 510. Vendor menu 510 displays a list of vendors with high bandwidth telecommunications cable within the selected metropolitan area. A user may select a particular vendor's cable from that available in the metropolitan area by placing a user positionable cursor over that vendor name and clicking to highlight the vendor name, and using the user positionable cursor to click the on button 536. Likewise, the user can turn off the display of a particular vendor's cable by selecting that vendor from vendor menu 510 and selecting the off button 538. The view route button 540 can be used to display a magnified map showing the selected vendor's cable in the map view 110. Vendor display hierarchy controls 530 allows a user to control the prioritized display of available cable based upon the vendor that owns that cable. For example, up-arrow 532 allows a particular vendor to be moved up in priority selection, while down-arrow 534 allows a particular vendor to be moved down in priority. In this fashion, a prioritized list of selected vendors may be created by a user. This prioritized list of vendors determines the display hierarchy used in displaying cable in the map view 110. As shall be further described subsequently, a selected vendor's cable may be displayed in the map view 110 with varying degrees of prominence, with the highest priority vendors being displayed with the greatest prominence. Alternatively, the prioritization of vendors may be used to determine which vendor's cable to display when cable from more than one selected vendor occupies the same route. In such a case, the cable of the higher priority vendor would be displayed instead of the cable of the lower priority vendor.

Figure 6:
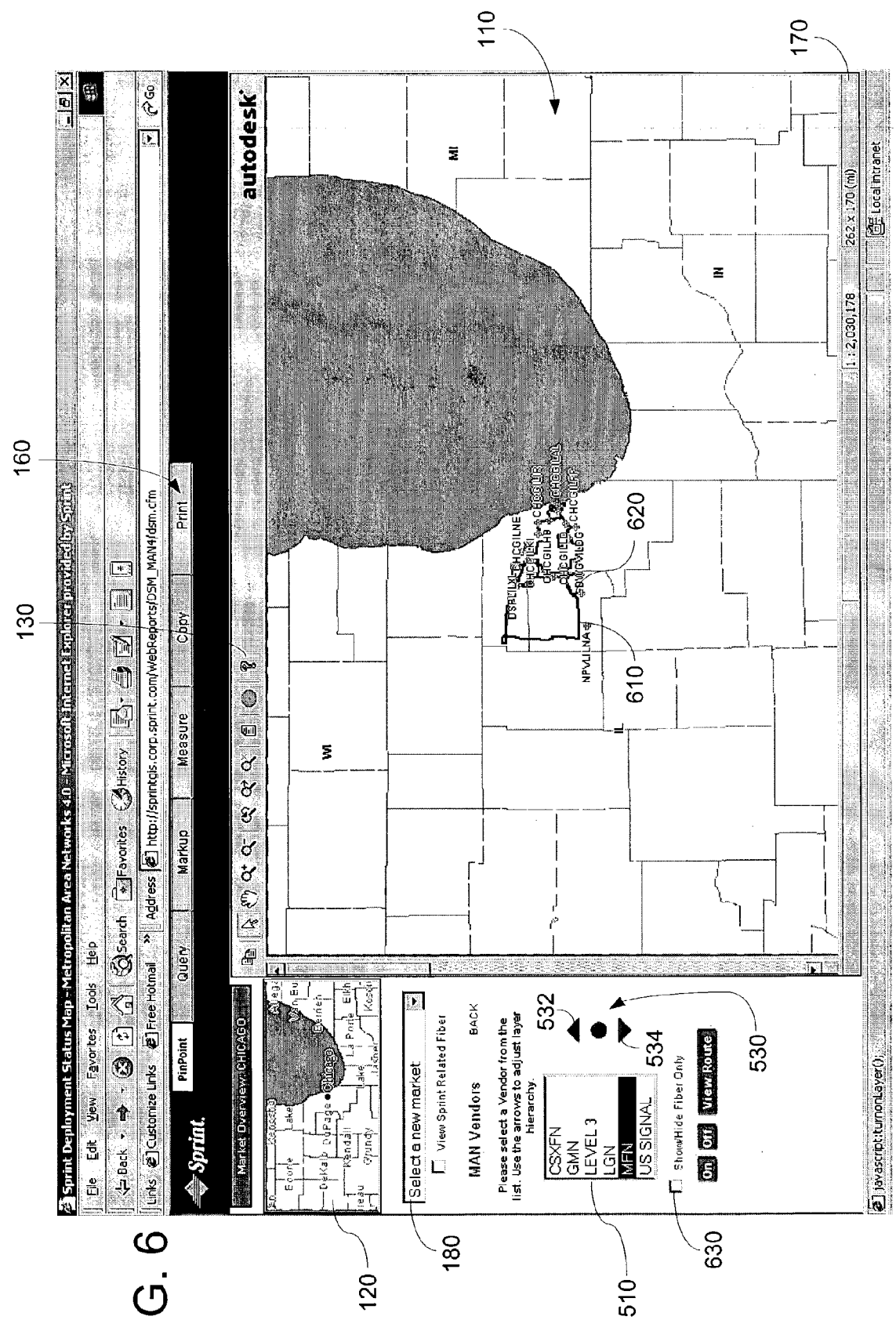
FIG. 6 illustrates the display of a vendor's cable within a selected metropolitan area.

Referring now to FIG. 6, a selected vendor's cable 610 is illustrated. Also illustrated are nodes, such as node 620, associated with the selected vendor's cable. A node, such as node 620, is a location where a connection to the vendor's cable may be made. Different graphical representations may be used to display different types of nodes. Nodes may be switches of different varieties, a point of presence for a particular vendor, a data center, a carrier hotel, a local carrier end office, a local carrier central office, or any other structure or location permitting an interface with the cable to be established. For example, a carrier hotel may be represented using a dot, while a switch may be illustrated using a star shaped symbol. Other ways of varying the graphical representation of nodes of different types will be apparent to one skilled in the art. A user may choose to display only the cable, only the nodes, or cable and nodes using display controls 630.

Figure 7:
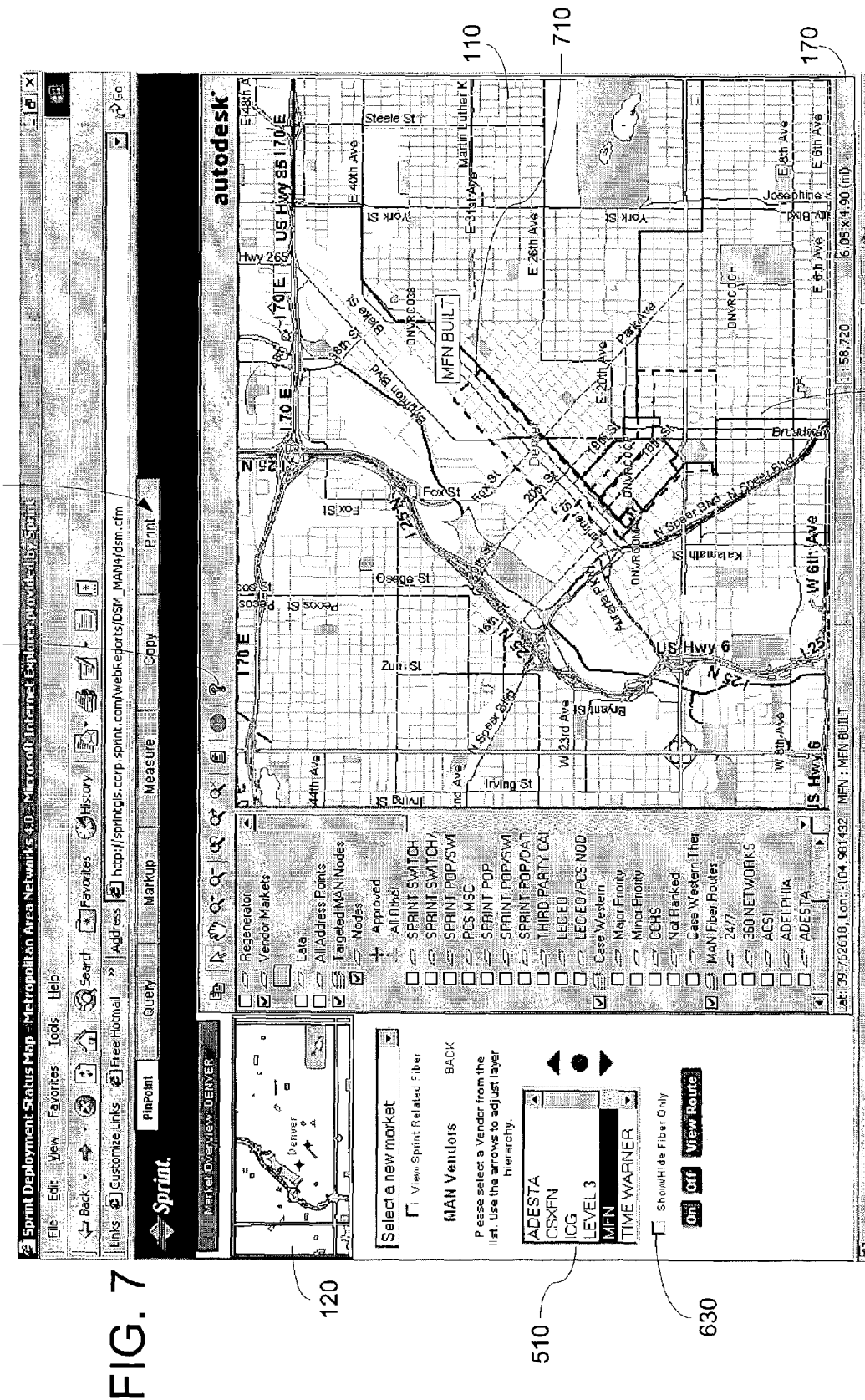
FIG. 7 illustrates the display of cable belonging to multiple vendors within a selected metropolitan area.

Referring now to FIG. 7, cable from multiple vendors is illustrated. It should be observed that map view 110 now displays a more detailed view of a portion of the selected metropolitan area. A user may control the magnification of the map view 110 using tool bar 130. A first vendor's cable 710 is shown with a first graphical depiction. A second vendor's cable 720 is shown with a second graphical depiction. Using different graphical depictions allows a user to visually discern between the vendors who own different displayed cables. Different graphical depictions may be simply using different colors in the display, or may also involve the use of different display formats, such as solid, broken, or dashed lines. As with the graphical representation of nodes, one skilled in the art will appreciate that a variety of different graphical representations may be used to differentiate between cables belonging to different vendors. Different graphical representations may also be used to correspond with the priority ranking of a particular vendor. For example, if the first vendor's cable 710 has been designated a higher priority, the line weight of the graphical representation of the first vendor's cable 710 may be heavier or otherwise bolder and more prominent than the graphical representation of the second vendor's cable 720, which has a lower priority. A wide variety of prominences may be used to allow the prioritized visual display of information for a user. Different graphical representations may also be used to differentiate between different types of cable, such as cables with varying bandwidth capacities, cables installed in different fashions, such as above ground versus underground, or to distinguish planned cable installations from presently available cable installations.

Figure 8:
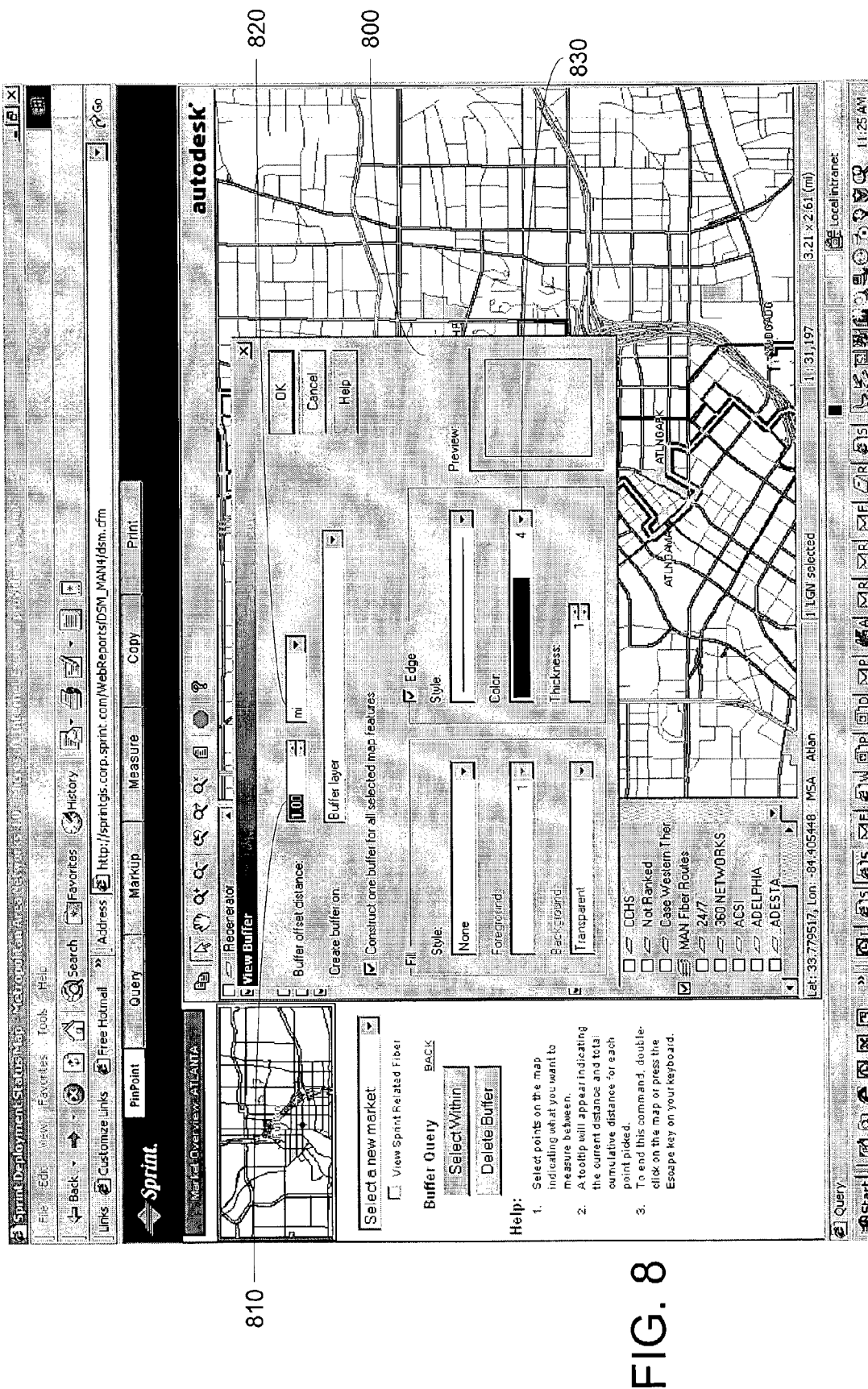
FIG. 8 illustrates the definition of a buffer in accordance with the present invention.

Referring now to FIG. 8, the definition of a buffer in accordance with the present invention is illustrated. A buffer is a region extending a user defined linear distance from a particular feature displayed in the map view 110. For example, a user may select a particular cable and then establish a buffer around that cable. Buffer dialog box 800 allows a user to set the parameters of that buffer. For example, a user may establish the distance amount using menu 810 and the units of distance using menu 820. A user may also control the graphical display of the buffer in the map view 110 using display controls 830.

Figure 9:
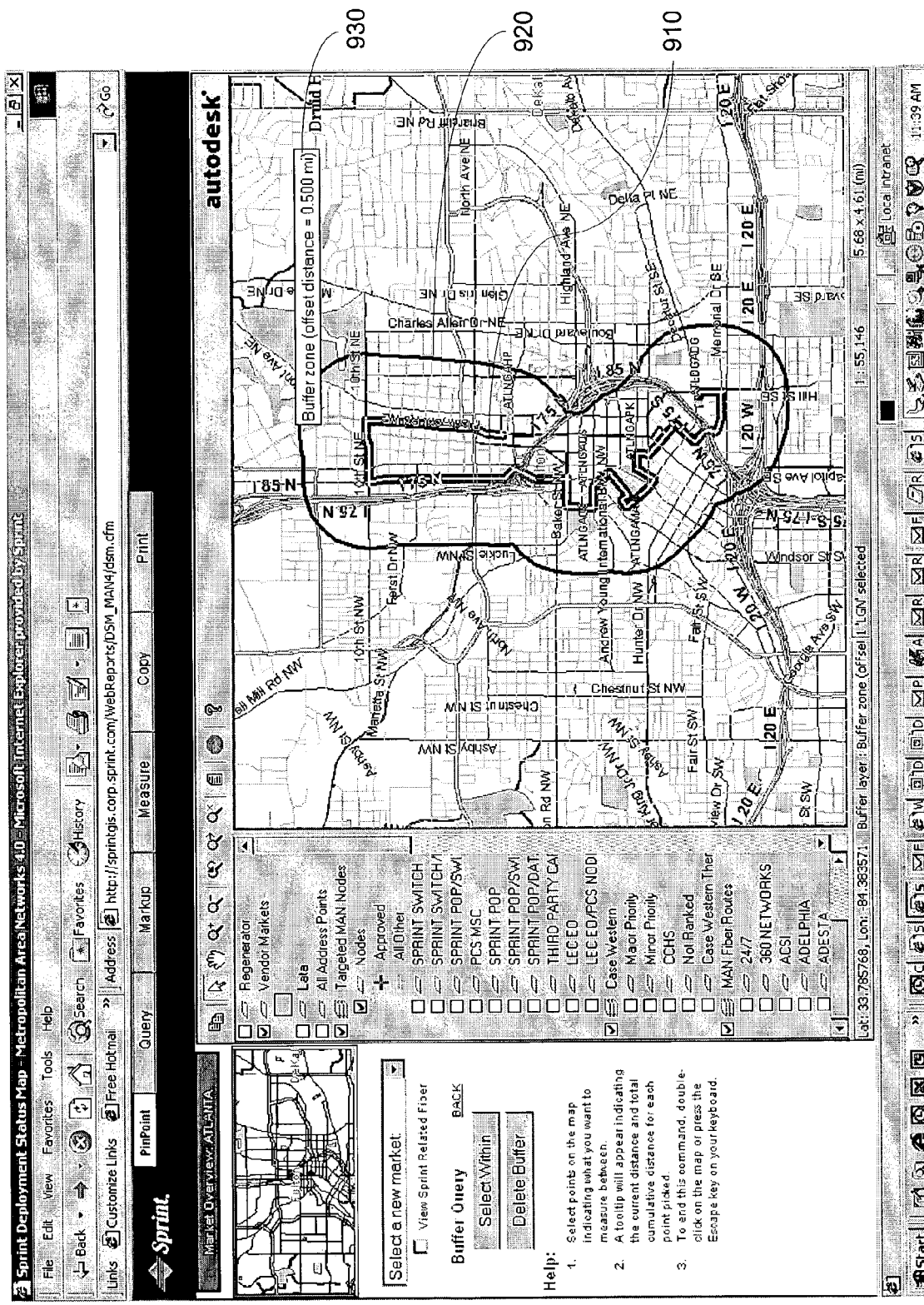
FIG. 9 illustrates the display of a buffer in accordance with the present invention.

Referring now to FIG. 9, a buffer zone 930 is illustrated around cable 910 extending to an exterior perimeter 920. Such a buffer zone 930 may be useful for a variety of planning purposes, such as determining the amount of nodes present within that zone 930, the amount of perspective customers within that zone 930, other available telecommunications cable within that zone 930, or other information as defined by a user.

Figure 10:
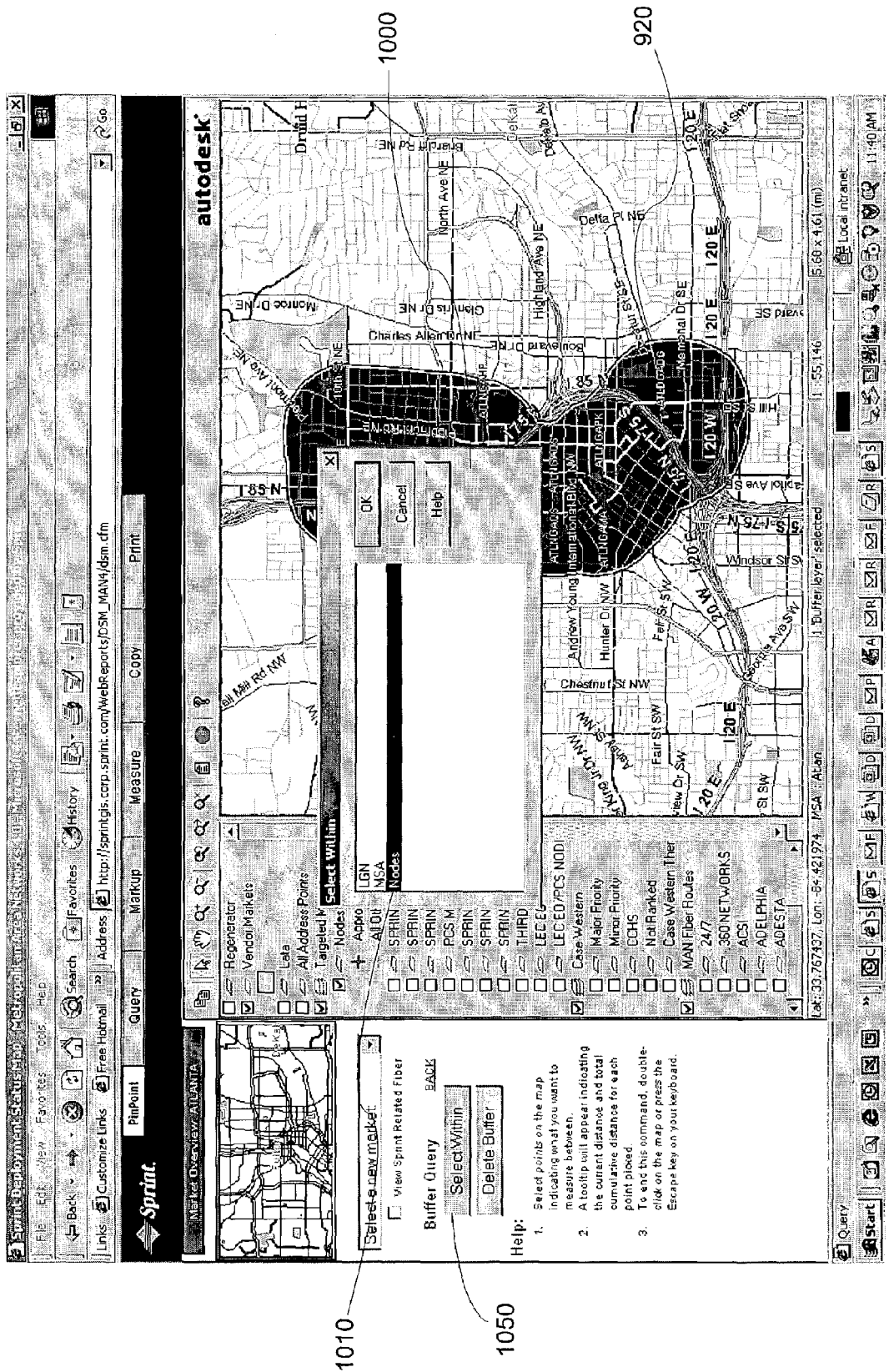
FIG. 10 illustrates the construction of a buffer query in accordance with the present invention.

Referring now to FIG. 10, the use of a buffer query in accordance with the present invention is illustrated. A buffer query button 1050 has been selected to generate a query dialog 1000. As illustrated in FIG. 10, the user has selected to query for available nodes 1010 within the buffer 930.

Figure 11:
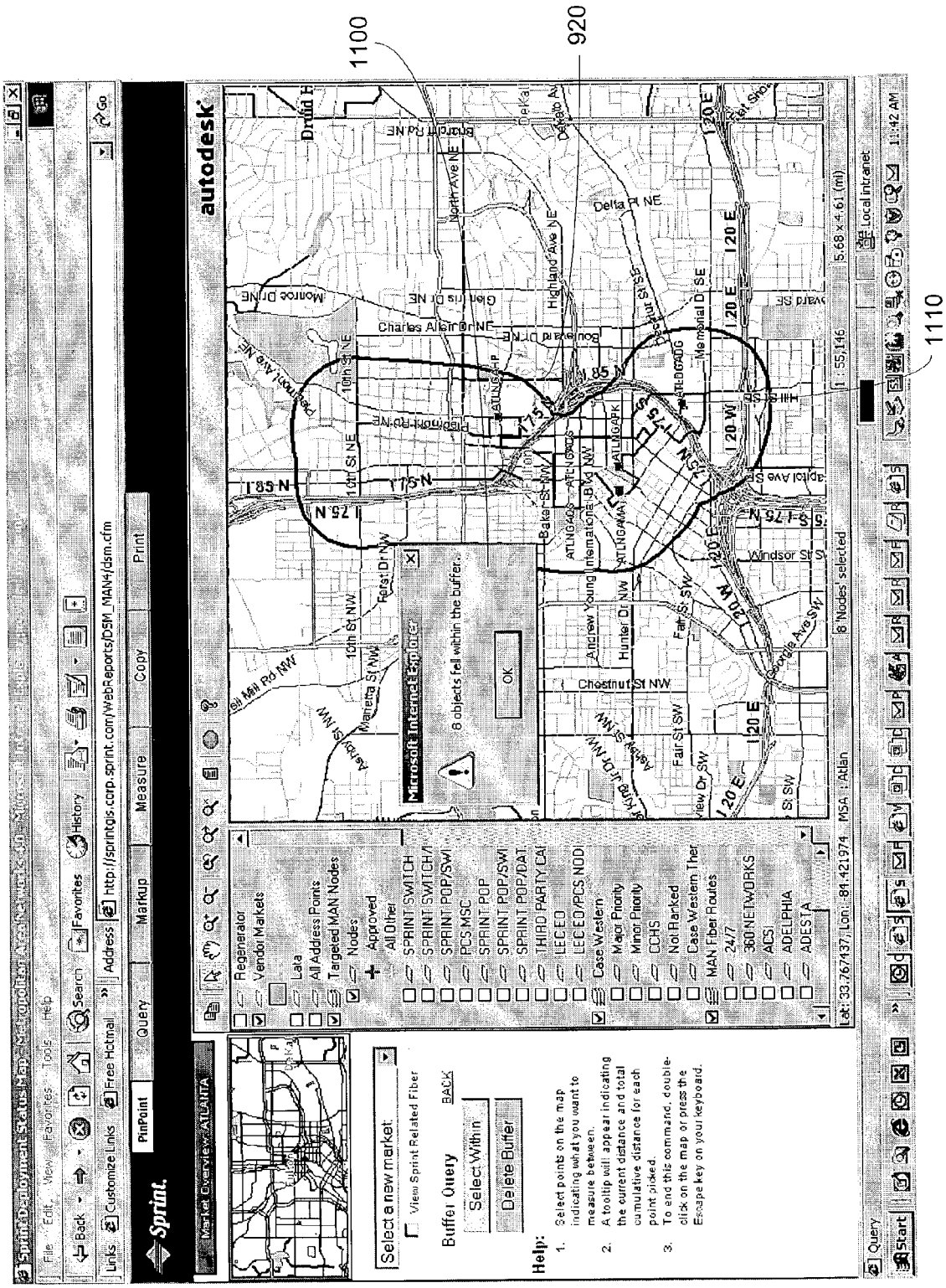
FIG. 11 illustrates the response to a buffer query in accordance with the present invention.

FIG. 11 illustrates the results of the user query. In this example, a query response 1100 responds that eight nodes fell within the user defined buffer 930.

Figure 12:
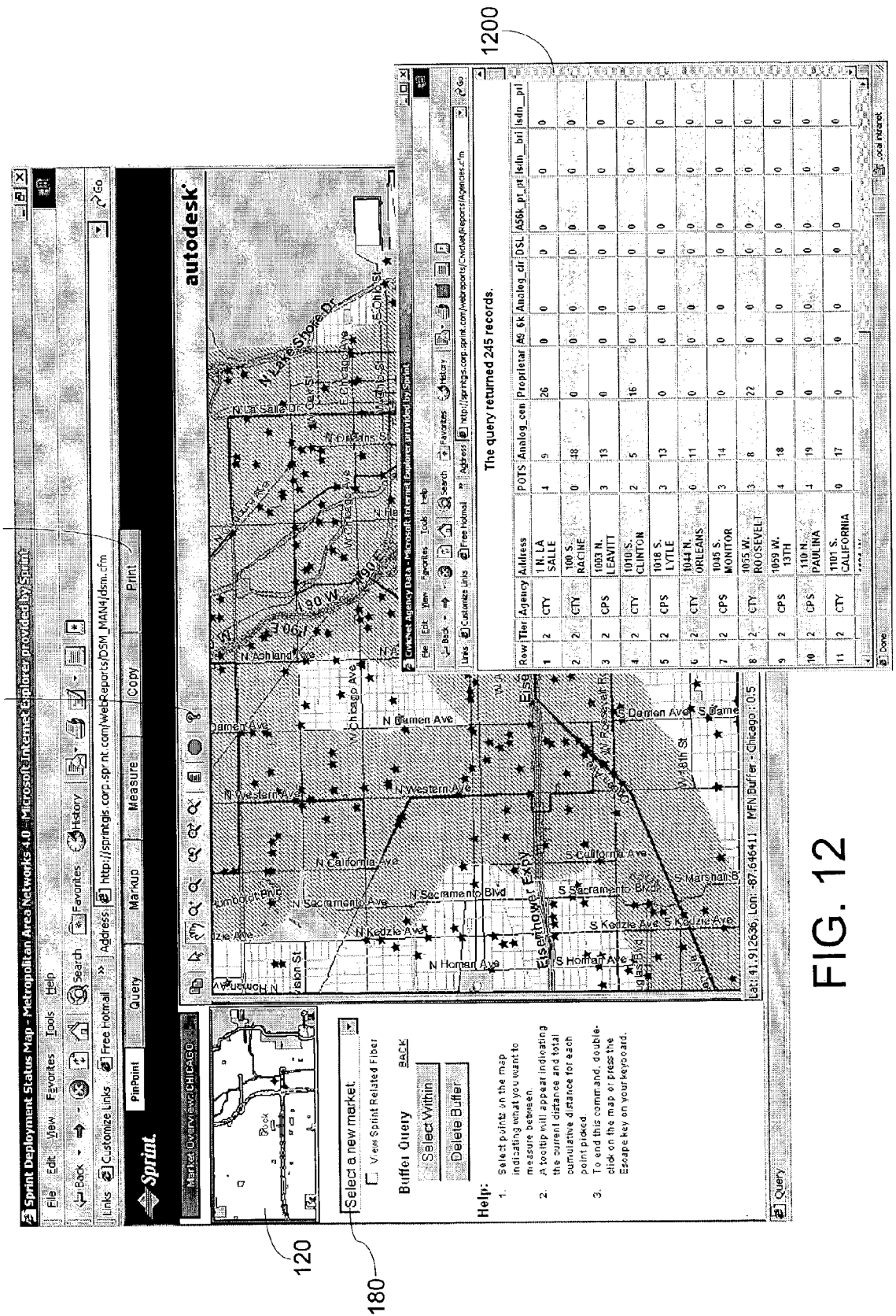
FIG. 12 illustrates the detailed response to a buffer query in accordance with the present invention.

FIG. 12 illustrates a detailed query response 1200. As can be seen in FIG. 12, a detailed query response 1200 may include information relating to geographical location, ownership, qualities and attributes, distance, or other information as defined by a user as a report.

As explained in the foregoing, the present invention allows for the maintenance and display of information relating to high bandwidth telecommunications cable networks within a variety of metropolitan areas. A plurality of metropolitan areas can be included in the present invention. The metropolitan areas may be within the United States or abroad. The present invention allows a user to select a metropolitan area for consideration. After a metropolitan area has been selected, vendors with high bandwidth telecommunications cable within that metropolitan area are displayed for selection by a user. The user may simply select vendors for display, or may create a prioritized selection of vendors and a vendor display hierarchy. If the user creates a prioritized selection of vendors, the cable associated with each vendor will be graphically displayed in a prominence corresponding with the priority assigned to a given vendor. A user may also define a buffer around a particular area, such as around a particular selected cable. The characteristics of a buffer, such as the distance that it extends from the selected cable, may be controlled by the user. After a buffer has been defined in accordance with the present invention, a buffer query may be generated to determine the presence of particular user defined items, such as nodes, within that buffer zone. It is further possible for a user to select a particular location, either by using the latitude and longitude corresponding to that location, a street address, or a user positionable cursor to designate that particular location within a metropolitan area.

While the present invention is not limited to any particular programming language or data format, it has been particularly implemented with Autodesk's MapGuide software, Macromedia's Cold Fusion software, and Java-Script programming language utilizing an Oracle Spatial database.

What is claimed is:

1. A method for maintaining and graphically displaying information regarding the geographic location of telecommunications cable in a metropolitan area, the method comprising:

receiving geographic information in a computer readable form sufficient to generate an electronic map of the metropolitan area;
receiving vendor information in a computer readable form for at least one vendor who owns telecommunication cable in the metropolitan area, the vendor information comprising:
the location of telecommunications cable in the metropolitan area;
the owner of the telecommunications cable;
the locations of nodes associated with the telecommunications cable; and
the type of nodes associated with the telecommunication cable;
providing a graphical user interface permitting the user to select at least one vendor from the at least one vendors who owns telecommunications cable in the metropolitan area;
receiving user input selecting at least one of the vendors who own telecommunications cable in the metropolitan area;
generating a display layer graphically illustrating the metropolitan area;
generating display layers graphically illustrating the vendor information for the telecommunications cable of each of the vendors selected by the user;
displaying the display layer graphically illustrating the metropolitan area and the display layers graphically illustrating the vendor information for the telecommunications cable of each of the at least one vendors selected by the user;
receiving user input selecting a high bandwidth telecommunications cable displayed over the map of the selected metropolitan area;
receiving user input defining a buffer zone extending from the selected high bandwidth telecommunications cable based upon the linear distance from the selected high bandwidth telecommunications cable;
displaying the buffer zone defined by the user over the map of the selected metropolitan area;
receiving a user query regarding the contents of the buffer zone defined by the user;
searching the electronic map of the metropolitan area and the electronic maps of the metropolitan area and the electronic maps of the high bandwidth telecommunications cable to answer the user query; and
displaying the answer to the user query.

2. The method of claim 1 wherein generating display layers graphically illustrating the vendor information for the telecommunications cable of each of the vendors selected by the user further comprises:
generating a graphical representation of the geographical location of the telecommunications cable owned by the selected vendors; and
generating a graphical representation of the geographical locations of nodes associated with the telecommunications cable owned by the selected vendors.

3. The method of claim 2 wherein generating a graphical representation of the geographical locations of nodes further comprises generating a different symbolic representation of each node type.

4. The method of claim 2 wherein generating a graphical representation of the geographical location of the telecommunications cable owned by the selected vendors further comprises generating a different symbolic representation for the telecommunications cable of each vendor.

5. The method of claim 1 wherein receiving user input selecting at least one of the vendors who own telecommunications cable in the metropolitan area comprises receiving a prioritized selection of at least two vendors.

6. The method of claim 5 wherein generating display layers graphically illustrating the vendor information comprises:
generating a different graphical representation of the geographical location of each of the telecommunications cable owned by the at least two prioritized vendor selections of the user; and
generating a different graphical representation of the geographical locations of nodes associated with the telecommunications cable owned by the selected vendors.

7. The method of claim 6 wherein generating a different graphical representation of the geographical locations of the nodes further comprises generating a different symbolic representation of each node type.

8. The method of claim 7 wherein generating a different symbolic representation of the geographical location of each of the telecommunications cable owned by the at least two prioritized vendor selections of the user further comprises generating graphical representations that decrease in prominence as the priority of the corresponding vendor decreases.

9. A method for storing and graphically displaying information regarding a metropolitan area high bandwidth telecommunications network, the method comprising;
establishing computer maps of a plurality of metropolitan areas;
establishing a computer map of the high bandwidth telecommunications cable owned by individual vendors in each of the plurality of metropolitan areas, the maps of the high bandwidth telecommunications cable comprising;
the geographical location of the high bandwidth telecommunications cable owned by that vendor in the metropolitan area; and
the geographical locations of nodes associated with the high bandwidth telecommunications cable owned by that vendor in the metropolitan area;
displaying a list of the plurality of metropolitan areas;
receiving user input selecting one of the plurality of metropolitan areas;
displaying a list of vendors who own high bandwidth telecommunications cable in the selected metropolitan area;
receiving user input selecting at least one vendor from the list of vendors who own high bandwidth telecommunications cable in the selected metropolitan area;
displaying the electronic map of the selected metropolitan area; and
displaying the electronic maps of the high bandwidth telecommunications cable owned by the selected vendors over the map of the selected metropolitan area;
receiving user input selecting a high bandwidth telecommunications cable displayed over the map of the selected metropolitan area;
receiving user input defining a buffer zone extending from the selected high bandwidth telecommunications cable based upon the linear distance from the selected high bandwidth telecommunications cable;
displaying the buffer zone defined by the user over the map of the selected metropolitan area;
receiving a user query regarding the contents of the buffer zone defined by the user;

searching the electronic map of the metropolitan area and the electronic maps of the metropolitan area and the electronic maps of the high bandwidth telecommunications cable to answer the user query; and displaying the answer to the user query.

10. The method of claim 9 wherein:
displaying a list of vendors who own high bandwidth telecommunications cable in the selected metropolitan area;
receiving user input selected at least one vendor from the list of vendors who own high bandwidth telecommunications cable in the selected metropolitan area;
displaying the electronic map of the selected metropolitan area; and
displaying the electronic maps of the high bandwidth telecommunications cable owned by the selected vendors over the map of the selected metropolitan area;
can occur simultaneously after receiving user input selecting one of the plurality of metropolitan areas.

11. The method of claim 9 further comprising:
receiving user input selecting a geographical location; and
displaying a graphical representative of the selected geographical location over the map of the selected metropolitan area.

12. The method of claim 11 wherein receiving user input selecting a geographical location comprises:
providing a cursor positionable by the user over the map of the selected metropolitan area; and
receiving user input when the cursor is positioned over the geographical location selected by the user.

13. The method of claim 11 wherein receiving user input selecting a geographical location comprises receiving a latitude and longitude from a user.

14. The method of claim 11 wherein receiving user input selecting a geographical location comprises receiving a street address from a user.

15. The method of claim 9 wherein:
receiving user input selecting at least one vendor from the list of vendors who own high bandwidth telecommunications cable in the selected metropolitan area comprises receiving user input selecting a plurality of vendors and ranking the plurality of vendors selected in ascending priority; and
displaying the computer maps of the high bandwidth telecommunications cable owned by the selected vendors over the map of the selected metropolitan area comprises displaying the electronic maps of the high bandwidth telecommunications cable owned by the selected vendors in ascending prominence corresponding to the ascending priority given each selected vendor.

16. The method of claim 9 wherein displaying the electronic maps of the high bandwidth telecommunications cable owned by the selected vendors over the map of the selected metropolitan area further comprises:
displaying a different graphical representation of the high bandwidth telecommunications cable owned by each selected vendor; and
displaying a different graphical representation of the nodes associated with the high bandwidth telecommunications cable owned by each selected vendor.

17. The method of claim 16 wherein displaying a different graphical representation of the nodes associated with the high bandwidth telecommunications cable owned by each selected vendor further comprises displaying a different symbolic representation of each different kind of node.

18. The method of claim 9 further comprising:
receiving a user input selecting a high bandwidth telecommunications cable displayed over the map of the selected metropolitan area; and
receiving user input defining a buffer zone extending from the selected high bandwidth telecommunications cable based upon the linear distance from the selected high bandwidth telecommunications cable.

19. The method of claim 18 further comprising displaying the buffer zone defined by the user over the map of the selected metropolitan area.

20. The method of claim 18 further comprising:
receiving a user query regarding the contents of the buffer zone defined by the user;
searching the electronic map of the metropolitan area and the electronic maps of the metropolitan area and the electronic maps of the high bandwidth telecommunications cable to answer the user query; and
displaying the answer to the user query.

21. A computer-readable medium containing computer-readable code embodied thereon for causing a computer to perform a method of maintaining and displaying information regarding the geographical location of high bandwidth telecommunication cable and its associated nodes within a metropolitan area, the method comprising:
receiving and storing electronic information for mapping a plurality of metropolitan areas;
receiving and storing vendor information for each of the plurality of metropolitan areas, the vendor information comprising:
the identity of the vendor;
the location of the high bandwidth telecommunications cable owned by the vendor in each of the plurality of metropolitan areas;
the location of nodes associated with the high bandwidth telecommunications cable owned by the vendor; and
the type of each node;
providing a graphical user interface to display information to a user and to receive input from a user;
displaying a list of the plurality of metropolitan areas;
receiving user input selecting a metropolitan area;
displaying a geographical map of the selected metropolitan area;
displaying a list of the vendors who own high bandwidth telecommunications cable in the selected metropolitan area;
receiving user input selecting at least one vendor from the list of vendors who own high bandwidth telecommunications cable in the selected metropolitan area;
displaying the location of the high bandwidth telecommunications cable owned by the selected vendors over the geographical map of the selected metropolitan area;
receiving a user input selecting a high bandwidth cable from those displayed over the display of the geographical map of the selected metropolitan area;
receiving a user input defining a buffer region extending a user defined distance from the selected cable;
displaying a graphical representation of the buffer region over the display of the geographical map of the metropolitan area;
receiving user input querying as to the contents of the buffer region; and
displaying the results of the user query.

22. The computer-readable medium of claim 21, wherein the method of further comprises displaying the nodes associated with the high bandwidth telecommunications cable owned by the selected vendors.

23. The computer-readable medium of claim 21 wherein the method of further comprises:
  receiving user input designating whether to display nodes; and
  if a user inputs a designation to display nodes, displaying the nodes associated with the high bandwidth telecommunications cable owned by the selected user.

24. The computer-readable medium of claim 23 wherein displaying the location of the high bandwidth telecommunications cable owned by the selected vendors over the geographical map of the selected metropolitan area further comprises displaying different graphical representations of the high bandwidth telecommunications cable owned by each of the selected vendors.

25. The computer-readable medium of claim 23 wherein receiving user input selecting at least one vendor from the list of vendors who own high bandwidth telecommunications cable in the selected metropolitan area further comprises receiving user input selecting at least two vendors in a priority order from highest to lowest priority.

26. The computer-readable medium of claim 25 wherein displaying the location of the high bandwidth telecommunications cable owned by the selected vendors over the geographical map of the selected metropolitan area further comprises displaying the location of the high bandwidth telecommunications cable owned by the at least two vendors selected in a priority order in a prominence corresponding with the vendors priority, the highest priority vendor's cable being the most prominent and the lowest priority vendor's cable being the least prominent.

27. The computer-readable medium of claim 26 further comprising receiving user input selecting a physical location within the selected metropolitan area.

28. The computer-reading medium of claim 27 wherein receiving user input selecting a physical location with in the selected metropolitan area comprises:
  providing a user positionable cursor; and
  receiving user input when the cursor is positioned over the position on the display of the geographical map of the metropolitan area corresponding to the physical location to be designated.

29. The computer-readable medium of claim 27 wherein receiving user input selecting a physical location within the metropolitan area comprises receiving a latitude and longitude from the user.

30. The computer-readable medium of claim 27 wherein receiving user input selecting a physical location within the metropolitan area comprises receiving a street address from the user.

* * * * *